United States Patent
Iwata et al.

(10) Patent No.: US 6,826,469 B2
(45) Date of Patent: Nov. 30, 2004

(54) VEHICLE TRAVELING CONTROL SYSTEM

(75) Inventors: Yoshifumi Iwata, Anjo (JP); Yuu Tanaka, Kariya (JP); Katsuhiko Iwazaki, Shizuoka-ken (JP); Hisashi Satonaka, Susono (JP); Mitsuhiko Morita, Shizuoka-ken (JP); Tomohiko Endo, Toyota (JP); Seiji Kawakami, Susono (JP); Hiroaki Kataoka, Susono (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/339,343

(22) Filed: Jan. 10, 2003

(65) Prior Publication Data

US 2003/0154014 A1 Aug. 14, 2003

(30) Foreign Application Priority Data

Jan. 11, 2002 (JP) ........................................ 2002-005065

(51) Int. Cl.⁷ .............................................. G06F 7/00
(52) U.S. Cl. ........................... 701/93; 701/96; 701/121; 180/168; 180/170; 340/903
(58) Field of Search ............................. 701/93, 96, 121, 701/301; 180/168, 170; 340/435, 441, 903, 936

(56) References Cited

U.S. PATENT DOCUMENTS

| | | | | |
|---|---|---|---|---|
| 5,577,816 A | * | 11/1996 | Suzuki et al. | 303/174 |
| 6,074,020 A | * | 6/2000 | Takahashi et al. | 303/146 |
| 6,328,672 B1 | | 12/2001 | Eguchi | |
| 6,389,351 B1 | * | 5/2002 | Egawa et al. | 701/93 |
| 6,401,024 B1 | * | 6/2002 | Tange et al. | 701/96 |
| 6,665,603 B2 | * | 12/2003 | Jindo et al. | 701/96 |

FOREIGN PATENT DOCUMENTS

JP 10-278826 A 10/1998

* cited by examiner

Primary Examiner—Gertrude A. Jeanglaude
(74) Attorney, Agent, or Firm—Burns, Doane, Swecker & Mathis, L.L.P.

(57) ABSTRACT

A vehicle traveling control system includes a control mode for controlling a vehicle speed by applying braking force so as to maintain the vehicle speed at a predetermined driving force threshold vehicle speed or smaller than that while a predetermined driving force beyond a creeping torque has been applied. The applied driving force is reduced when a target braking force required for maintaining the vehicle speed at the predetermined upper threshold vehicle speed or smaller than that is equal to a first predetermined value or greater than that. The applied driving force is increased when the target braking force or the actual braking force becomes a second predetermined value or smaller than that during the applied driving force being reduced.

8 Claims, 3 Drawing Sheets

VEHICLE TRAVELING CONTROL SYSTEM

CROSS REFERENCE TO RELATED APPLICATIONS

This application is based on and claims priority under 35 U.S.C. § 119 with respect to a Japanese Patent Appllcauon 2002-005065, filed on Jan. 11, 2002, the entire content of which is incorporated herein by reference.

FIELD OF THE INVENTION

This invention generally relates to a vehicle traveling control system for controlling a vehicle speed at an upper threshold speed or smaller than that. More particularly, this invention pertains to a vehicle traveling control system for controlling a vehicle speed by applying braking force during driving force being applied in a state where the vehicle is slowly traveling.

BACKGROUND OF THE INVENTION

There have been various technologies conventionally known, in which a vehicle speed is controlled within a predetermined speed range while the vehicle is traveling. For example, an auto-cruising system has been conventionally known, in which a predetermined vehicle speed can be obtained by automatically adjusting an opening degree of a throttle valve while the vehicle is traveling within a relatively high-speed range.

On the other hand, a Japanese Patent Laid-Open No. 10(1998)-278825 discloses a technology for controlling a vehicle speed while a vehicle is slowly traveling at a slow-speed, in which the vehicle is automatically parked while it is traveling utilizing a creep force. In general, the vehicle speed is controlled in response to operation of a brake pedal by a vehicle driver. However, according to the above-disclosed technology, the brake pedal operation is properly carried out when the driver is alerted by an alerting unit that the actual vehicle speed has exceeded an intended vehicle speed range for performing the automatic parking. There has been other technology conventionally known, in which the vehicle speed is controlled by applying braking force to a vehicle wheel when the actual vehicle speed exceeds a predetermined threshold speed value, wherein the automatic parking can be properly performed.

While the vehicle is creeping, it is preferable to improve a vehicle speed controlling performance and to expand a vehicle speed control range. Torque-up operation has been conventionally known to increase driving force to be applied to the vehicle wheel so as to achieve the above-described objectives. However, requisite braking force under the torque-up operation is increased comparing with the requisite braking force when the torque-up operation has not been performed. Therefore, according to the aforementioned conventional technology, a vehicle braking system may be applied with greater load and the brake operating amount by the driver may be increased.

The present invention therefore seeks to provide an improved vehicle traveling control system capable of controlling the applied driving force without increasing the load applied to the braking system.

SUMMARY OF THE INVENTION

A vehicle traveling control system of the present invention includes a control mode for controlling a vehicle speed by applying braking force so as to maintain the vehicle speed at a predetermined upper threshold vehicle speed or smaller than that while a predetermined driving force beyond a creeping torque has been applied. The applied driving force is reduced when a braking force (a target braking force or an actual braking force) required for maintaining the vehicle speed at the predetermined upper threshold vehicle speed or smaller than that is equal to a first predetermined value or greater than that. Therefore, the load to a braking system or to a driver can be effectively reduced.

The applied driving force is increased when the target braking force or the actual braking force becomes a second predetermined value or smaller than that during the applied driving force being reduced. The second predetermined speed value is preset to be smaller than the first predetermined value. Therefore, the sufficient torque can be applied to a vehicle engine and a hunting condition of torque up and down operation can be restrained, wherein the driving condition is prevented from being deteriorated.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
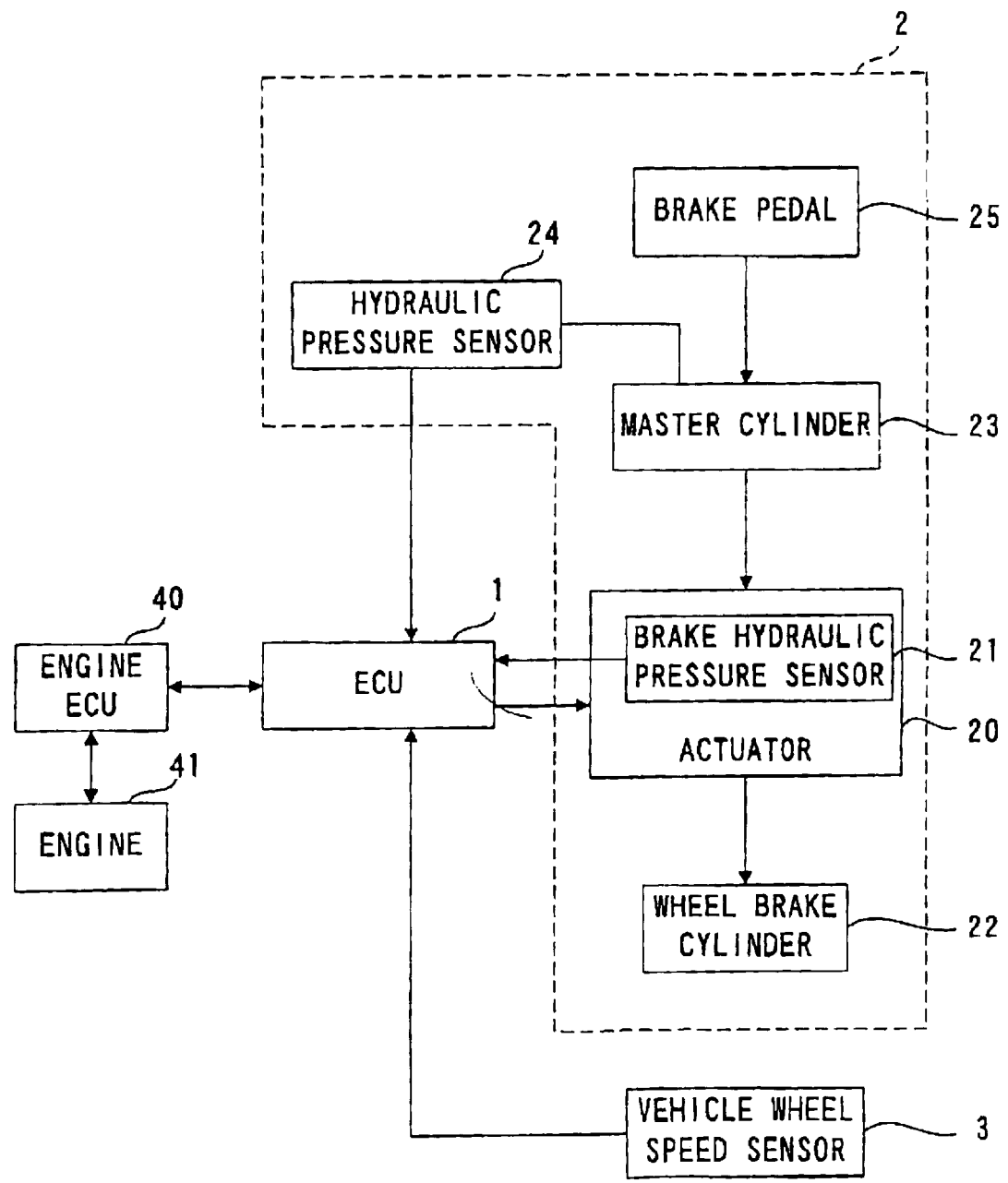
FIG. 1 is a block view illustrating a vehicle traveling control system according to an embodiment of the present invention.

Referring to FIG. 1, a vehicle traveling control system 100 according to an embodiment of the present invention serves not only for controlling the vehicle traveling condition but also as a brake control system for electronically controlling braking force applied to each vehicle wheel. A brake ECU 1 as a control unit of the vehicle traveling: control system 100 includes main components such as a central processing unit (CPU), a read only memory (ROM), a random access memory (RAM), an input signal circuit, an output signal circuit, and a power source circuit and stores a brake control routine and an upper threshold vehicle speed control routine.

A brake system 2 of the vehicle traveling control system 100 is a hydraulic-type brake system capable of independently controlling the braking force applied to each vehicle wheel. The brake system 2 includes main components such as a wheel brake cylinder 22, which is mounted in each vehicle wheel and operates a non-illustrated hydraulic-type disc brake, a master cylinder 23, which is operatively connected to a brake pedal 25 and generates hydraulic pressure in response to a driver's brake pedal depression, and an actuator 20, which is supplied with the hydraulic pressure from the master cylinder 23 and independently adjusts brake hydraulic pressure to be supplied to each wheel brake cylinder 22. The hydraulic pressure from the master cylinder 23 is detected by a hydraulic pressure sensor 24 and the brake hydraulic pressure to be supplied to each wheel brake cylinder 22 from the actuator 20 is detected by a brake hydraulic pressure sensor 21. The outputs from the hydraulic pressure sensor 24 and the brake hydraulic pressure sensor 21 are inputted into the brake ECU 1. The brake ECU 1 is further inputted with a signal outputted from a vehicle wheel speed sensor 3, which is equipped to each vehicle wheel for detecting each vehicle wheel speed, and exchanges various information with an engine ECU 40 for controlling an engine 41. Therefore, the vehicle traveling condition is cooperatively controlled by both the brake ECU 1 and the engine ECU 40.

Figure 2:
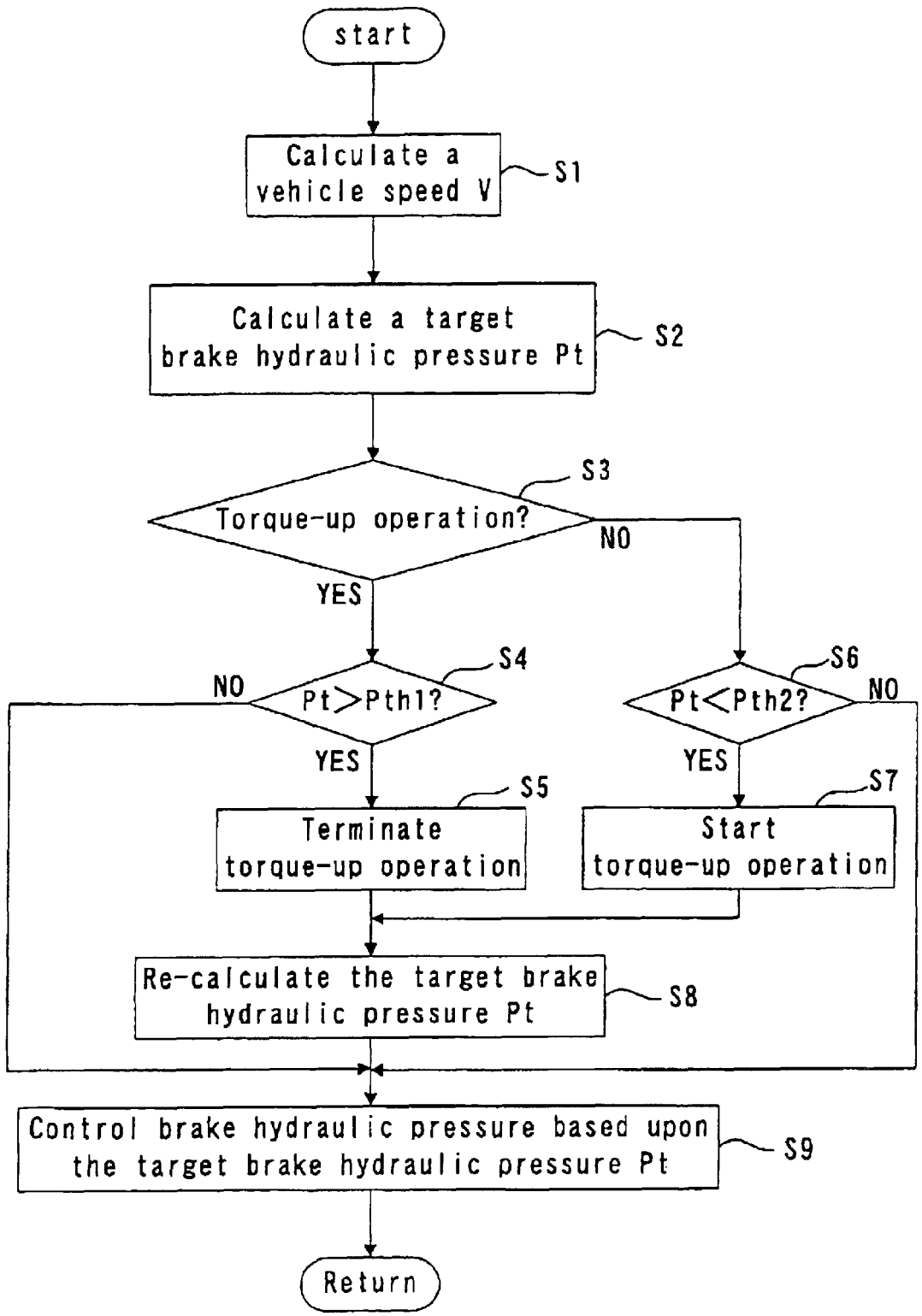
FIG. 2 illustrates a flow chart for explaining an upper threshold vehicle speed maintaining process by the vehicle traveling control system illustrated in FIG. 1.

Next, a vehicle traveling control according to the embodiment of the present invention is explained hereinbelow with reference to a flow chart illustrated in FIG. 2. As described above, the vehicle traveling control is performed cooperatively with the brake ECU 1 and the engine ECU 40. A main process of the vehicle traveling control is performed by the brake ECU 1. The vehicle traveling control according to the embodiment of the present invention is repeatedly executed at a predetermined timing while a slow speed traveling mode (a control mode) has been selected by the driver or by the other system and is terminated when the slow speed traveling mode is released.

The slow speed traveling mode is hereinafter referred to as a vehicle traveling mode for controlling the vehicle speed within a range between a value zero and a predetermined upper threshold vehicle speed Vref only based upon operation of the brake pedal 25 by the driver. Hereinafter, description of the vehicle traveling control under the slow speed traveling mode is applied only to a condition that an accelerator pedal (not shown) and the brake pedal 25 are not operated by the driver so as to simplify the description.

The vehicle traveling control is first performed at step S1 for calculating the vehicle speed V based upon each vehicle wheel speed detected by each vehicle wheel speed sensor 3. The process then proceeds to step S2 for calculating a target brake hydraulic pressure (a target braking force) Pt requisite for maintaining the vehicle speed V at the predetermined upper threshold vehicle speed Vref or smaller than that, in accordance with the vehicle speed V and a change of the vehicle speed V relative to a period of time (i.e. an acceleration). The process further proceeds to step 83 for Judging whether or not a torque-up operation has been performed. The torque-up operation is performed for increasing an RPM of the engine 41 with the engine 41 being in the idle state. Therefore, the vehicle speed adjusted range under the slow speed traveling mode can be effectively expanded by applying the driving force beyond a normal creeping torque.

When the torque-up operation is judged to have been performed at step S3, the process proceeds to step S4 so as to compare the target brake hydraulic pressure Pt with a threshold pressure value Pth1 (a first predetermined value). For example, the threshold pressure value Pth1 can be predetermined based upon a value of brake hydraulic pressure required for maintaining the vehicle speed at or less than the upper threshold vehicle speed Vref when the vehicle is traveling on a down-slope with a predetermined gradient or greater than that during the torque-up operation being performed.

When the target brake hydraulic pressure Pt is judged to be beyond the threshold pressure value Pth1 at step S4, the process proceeds to step S5 so as to terminate the torque-up operation. Accordingly, the driving force is decreased and an upper threshold value of the vehicle speed is decreased when the braking force has not been applied to any vehicle wheel. Therefore, the brake hydraulic pressure required for maintaining the vehicle speed at or less than the upper threshold vehicle speed Vref can be effectively decreased.

Subsequently, at step S8, the brake ECU 1 again calculates the target brake hydraulic pressure Pt required for maintaining the vehicle speed at or less than the upper threshold vehicle sped Vref corresponding to torque of the engine 41 which was released from the torque-up operation. The process then proceeds to step S9 for driving the actuator 20 so as to control the brake hydraulic pressure to be supplied to each wheel brake cylinder 22 to substantially correspond to the target brake hydraulic pressure Pt calculated at step S8 with reference to a value of the brake hydraulic pressure detected by the brake hydraulic pressure sensor 21. The vehicle traveling control is then completed.

When the target brake hydraulic pressure Pt is judged at step S4 to be substantially equal to the threshold pressure value Pth1 or smaller than that, the process directly proceeds to step S9 from step S4, wherein the brake hydraulic pressure to be supplied to each wheel brake cylinder 22 is controlled to substantially correspond to the target brake hydraulic pressure Pt calculated at step S2 during the torque-up operation still being performed. The vehicle traveling control is then completed.

On the other hand, when the torque-up operation is judged to have not been performed at step S3, the process proceeds to step S6 for comparing the target brake hydraulic pressure Pt with a threshold pressure value Pth2 (a second predetermined value). The threshold pressure value Pth2 is set to be smaller than the threshold pressure value Pth1. For example, the threshold pressure value Pth2 is predetermined based upon a value of brake hydraulic pressure required for maintaining the vehicle speed at or less than the upper threshold vehicle speed Vref when the vehicle is on a flat road during the torque-up operation not being performed.

When the target brake hydraulic pressure Pt is judged to be smaller than the threshold pressure value Pth2 at step S6, the process proceeds to step S7 so as to restart the torque-up operation. Accordingly, the driving force is increased and the upper threshold value of the vehicle speed is increased when the braking force has not been applied to any vehicle wheel. In this case, the vehicle accelerating performance can be effectively improved. Therefore, the vehicle can travel within a vehicle speed range up to the upper threshold vehicle speed, for example when the vehicle is traveling on an upslope.

Subsequently, at step S8, the brake ECU 1 again calculates the target brake hydraulic pressure Pt required for maintaining the vehicle speed at or less than the upper threshold vehicle speed Vref corresponding to torque of the engine 41 which was again traveling control is then completed.

When the target brake hydraulic pressure Pt is judged to be substantially equal to the threshold pressure value Pth2 or greater than that, the process proceeds to step S9 for controlling brake hydraulic pressure supplied to each wheel brake cylinder 22 based upon the target brake hydraulic pressure Pt calculated at step S2 with the torque-up operation being released.

Figure 3:
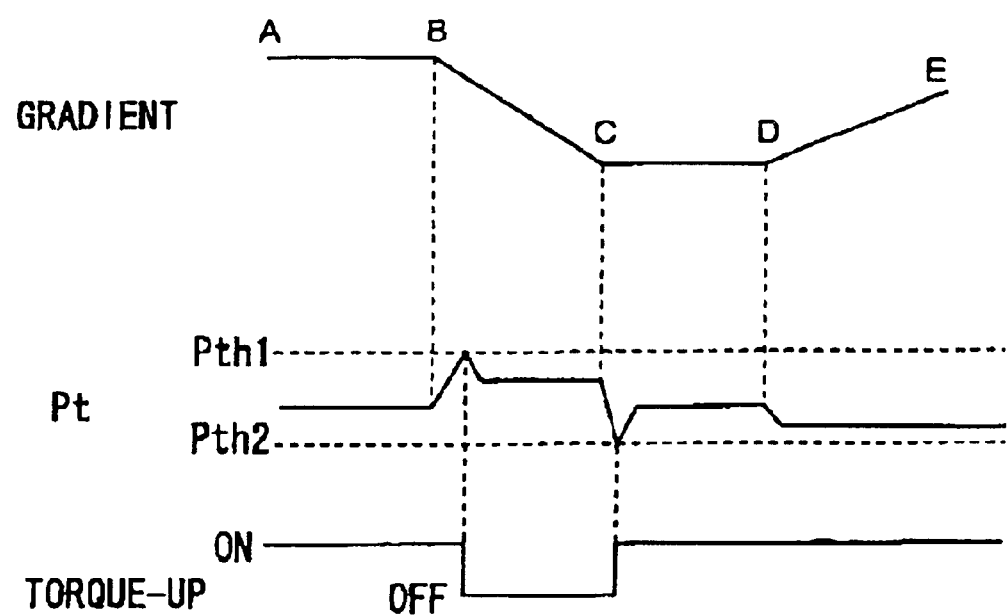
FIG. 3 is a time chart showing a result of the upper threshold vehicle speed maintaining process illustrated in FIG. 2 as an example.

Referring to FIG. 3, when the vehicle starts traveling on a down slope BC after traveling on a flat road AB at the upper threshold vehicle speed Vref, the vehicle may be accelerated due to gravity. Therefore, the target brake hydraulic pressure Pt required for maintaining the vehicle speed at or less than the upper threshold vehicle speed Vref is increased. The driving force is decreased by releasing the engine 41 from being activated by the torque-up operation at a time that the target brake hydraulic pressure Pt exceeds the threshold pressure value Pth 1, wherein the target brake hydraulic pressure Pt is maintained at a low level. When the vehicle then starts to travel on a flat road CD, the requisite brake hydraulic pressure is decreased. Subsequently, the torque-up operation is restarted at a time that the target brake hydraulic pressure Pt becomes smaller than the threshold pressure value Pth2. Accordingly, the target brake hydraulic pressure Pt exceeds the threshold pressure value Pth2 on an upslope DE and the vehicle can effectively travel within the vehicle speed range up to the upper threshold value Vref.

It is preferable that the slow speed traveling mode according to the embodiment of the present invention is employed, for example when the vehicle is traveling in a rearward direction to be parked. More specifically, it is preferable that the slow speed traveling mode is employed when the vehicle is assisted to be parked by an automatic steering control or a steering guiding.

As described above, according to the embodiment of the present invention, the torque-up operation is terminated and restarted by comparing the target brake hydraulic pressure Pt with the threshold pressure value Pth1 or Pth2. Alternatively, the torque-up operation can be terminated and restarted by estimating the braking force actually being supplied to each vehicle wheel based upon a brake hydraulic pressure of each wheel brake cylinder 22. In this case, the actual brake hydraulic pressure of each wheel brake cylinder 22 is referred to as a value of Pt shown in FIGS. 2 and 3. When the torque-up operation is controlled based upon the actual braking force, load applied to a vehicle braking system can be effectively reduced without continuously performing the torque-up operation not only when the vehicle travels on a slope but also when the vehicle has been traveling with the brake pedal 25 being depressed by the driver. When the braking force is then reduced in response to releasing operation of the brake pedal 25 by the driver, the torque-up operation is applied to the engine 41 of the vehicle again. Therefore, the torque of the engine 41 is increased when the vehicle is started and the vehicle start moving performance is effectively improved resulting in improvement of a vehicle speed control performance.

According to the embodiment of the present invention, the driving force can be applied without increasing load applied to the vehicle brake system by releasing and restarting the torque-up operation. Alternatively, the driving force can be applied to the vehicle wheel without increasing the load applied to the vehicle brake system by changing the amount of the driving force increased in accordance with the torque-up operation in stages.

In the above described embodiment, the vehicle traveling control system may comprise a release mode. In this release mode, in case of that a release condition of the slow speed traveling mode is established during the slow speed traveling mode, the vehicle traveling control system changes from the slow speed traveling mode to a normal traveling mode according to the operation of the driver while restraining the ascent of the vehicle's speed. In the release mode, the braking force may be decreased under a predetermined condition. For example, the braking force may be adjusted so as to obtain a predetermined acceleration. Alternatively, the upper threshold vehicle speed may be decreased with a predetermined deceleration. Further, in the release mode, the control in the slow speed traveling mode may be continued until the driver operates the brake. Further, in the release mode, the braking force at the establishment of the release may be kept until the driver operates the brake.

In the above described embodiment, the vehicle traveling control system may release or reduce the torque-up operation when the vehicle stops more than a predetermined time at the slow speed traveling mode. Further, in case that the vehicle continues stopped after the torque-up operation is released or reduced, it is preferable that an alarm means prompts the driver to release the parking assist operation. Further. In case that the vehicle moves continuously more than a predetermined time, it is preferable that the torque-up operation is reapplied.

In the above described embodiment, the vehicle traveling control system may comprise a judgment means for judging low visibility condition on the basis of the surrounding circumstances and may change the upper threshold vehicle speed at the slow speed traveling mode in response to the judge result of the judgment means. It is preferable that the judgment means performs a judge on the basis of an output signal of at least one of a raindrop sensor, an illumination sensor, a light switch or a wiper switch. Further, the vehicle traveling control system may change the driving force of the engine in response to the judge result of the judgment means. Further, the vehicle traveling control system may change the upper threshold vehicle speed in response to the route position during the parking assist operation.

As described above, according to the embodiment of the present invention, the applied driving force is reduced when the target braking force or the actual braking force is substantially equal to or greater than the first predetermined value during the control mode for controlling the vehicle speed to be equal to or less than the predetermined upper threshold vehicle speed applying a predetermined driving force which exceeds a creeping torque. Therefore, the load applied to the braking system can be effectively reduced and the vehicle speed controlling performance can be effectively maintained.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A vehicle traveling control system comprising: a control mode for controlling a vehicle speed by applying braking force so as to maintain the vehicle speed at or less than a predetermined upper threshold vehicle speed and applying a predetermined driving force which exceeds a creeping torque while the vehicle is creeping, wherein the applied driving force is reduced when a target braking force required for maintaining the vehicle speed at or less than the predetermined upper threshold vehicle speed is equal to or greater than a first predetermined value.

2. A vehicle traveling control system according to claim 1, wherein the applied driving force is increased when the target braking force is equal to or smaller than a second predetermined value as the applied driving force is being reduced, the second predetermined speed value is preset to be smaller than the first predetermined value.

3. A vehicle traveling control system comprising: a control mode for controlling a vehicle speed by applying braking force so as to maintain the vehicle speed at or less than a predetermined upper threshold vehicle speed and applying a predetermined driving force which exceeds a creeping torque while the vehicle is creeping, wherein the applied driving force is reduced when the braking force actually being applied is equal to or greater than a first predetermined value.

4. A vehicle traveling control system according to claim 3, wherein the applied driving force is increased when the braking force actually being applied is equal to or smaller than a second predetermined value as the applied driving force is being reduced, the second predetermined value is preset to be smaller than the first predetermined value.

5. A vehicle traveling control system according to claim 2, further comprising:
  a wheel brake cylinder mounted in a vehicle wheel;
  a master cylinder operatively connected to a brake operating member and generating hydraulic pressure in response to a driver's brake operating member operation; and
  an actuator supplied with the hydraulic pressure from the master cylinder and independently adjusting brake hydraulic pressure to be supplied to the wheel brake cylinder,
wherein the target braking force corresponds to a target brake hydraulic pressure supplied to the wheel brake cylinder, and the target brake hydraulic pressure is calculated based upon the vehicle speed and a change of the vehicle speed relative to a period of time.

6. A vehicle traveling control system according to claim 4, further comprising:
  a wheel brake cylinder mounted in a vehicle wheel;
  a master cylinder operatively connected to a brake operating member and generating hydraulic pressure in response to a driver's brake operating member operation; and
  an actuator supplied with the hydraulic pressure from the master cylinder and independently adjusting brake hydraulic pressure to be supplied to the wheel brake cylinder,
  wherein the braking force actually being applied is estimated based upon the brake hydraulic pressure supplied to the wheel brake cylinder.

7. A vehicle traveling control system comprising:
  a vehicle speed calculating means for calculating a vehicle speed;
  a target brake hydraulic pressure calculating means for calculating a target brake hydraulic pressure required for maintaining the vehicle speed at or less than a predetermined upper threshold vehicle speed;
  a torque-up operation judging means for judging whether or not the torque-up operation has been performed;
  a first comparing means for comparing the target brake hydraulic pressure with a first predetermined value when the torque-up operation is judged to have been performed;
  a torque-up operation terminating means for terminating the torque-up operation when the target brake hydraulic pressure exceeds the first predetermined value;
  a target brake hydraulic pressure recalculating means for recalculating the target brake hydraulic pressure required for maintaining the vehicle speed at or less than the predetermined upper threshold vehicle speed when the torque-up operation has not been performed; and
  a brake hydraulic pressure controlling means for controlling a brake hydraulic pressure based upon the recalculated target brake hydraulic pressure.

8. A vehicle traveling control system according to claim 7, further comprising:
  a second comparing means for comparing the target brake hydraulic pressure with a second predetermined value when the torque-up operation is judged to have not been performed, the second predetermined value being preset to be smaller than the first predetermined value; and
  a torque-up operation restarting means for restarting the torque-up operation when the target brake hydraulic pressure is judged to be smaller than the second predetermined value.

* * * * *